United States Patent [19]

Kimura

[11] Patent Number: 4,504,131
[45] Date of Patent: Mar. 12, 1985

[54] CAMERA

[75] Inventor: Hiroyuki Kimura, Kanagawa, Japan

[73] Assignee: Canon Kabushiki Kaisha, Tokyo, Japan

[21] Appl. No.: 347,048

[22] Filed: Feb. 8, 1982

[30] Foreign Application Priority Data

| Feb. 13, 1981 | [JP] | Japan | 56-19608 |
| Feb. 24, 1981 | [JP] | Japan | 56-25851 |
| Feb. 24, 1981 | [JP] | Japan | 56-25852 |
| Feb. 24, 1981 | [JP] | Japan | 56-25853 |
| Feb. 24, 1981 | [JP] | Japan | 56-25854 |
| Feb. 25, 1981 | [JP] | Japan | 56-26608 |
| Feb. 26, 1981 | [JP] | Japan | 56-27299 |
| Feb. 26, 1981 | [JP] | Japan | 56-27300 |
| Feb. 26, 1981 | [JP] | Japan | 56-27301 |
| Feb. 27, 1981 | [JP] | Japan | 56-28173 |
| Feb. 27, 1981 | [JP] | Japan | 56-28174 |
| Mar. 5, 1981 | [JP] | Japan | 56-31521 |
| Mar. 5, 1981 | [JP] | Japan | 56-31522 |
| Mar. 5, 1981 | [JP] | Japan | 56-31523 |
| Mar. 5, 1981 | [JP] | Japan | 56-31524 |
| Mar. 11, 1981 | [JP] | Japan | 56-34898 |
| Mar. 11, 1981 | [JP] | Japan | 56-34899 |

[51] Int. Cl.$^3$ ............................................. G03B 1/12
[52] U.S. Cl. ................................. 354/173.1; 354/214
[58] Field of Search ............................. 354/173, 214

[56] References Cited

U.S. PATENT DOCUMENTS

| 4,251,148 | 2/1981 | Stemme et al. | 354/173 |
| 4,274,726 | 6/1981 | Yoneyama et al. | 354/173 |
| 4,342,509 | 8/1982 | Wakabayashi et al. | 354/173 |
| 4,367,026 | 1/1983 | Terada et al. | 354/173 |

Primary Examiner—John Gonzales
Attorney, Agent, or Firm—Toren, McGeady and Stanger

[57] ABSTRACT

In the disclosed camera, film is continuously wound from the shaft of a film magazine loaded in the camera onto a spool in the camera, and then exposed frame by frame as the film is rewound into the camera. A motor drives either the spool or the magazine shaft on the basis of the direction of current therethrough and a detector detects loading of the magazine and changes the direction of the power supply to the motor from a condition for driving the magazine shaft to a condition for driving the spool.

23 Claims, 16 Drawing Figures

CAMERA

BACKGROUND OF THE INVENTION

1. Field of the Invention

This invention relates to cameras in which film is continuously wound onto a take-up reel from a film magazine loaded in the camera and then exposed frame by frame as the film is rewound into the magazine.

2. Description of the Prior Art

A camera in which film is continuously wound onto a take-up reel from a film magazine loaded in the camera and the film is rewound frame by frame into the film magazine during exposure, is disclosed in Japanese Patent Application Publication No. Sho 55-10054, published Mar. 13, 1980. The continuous take-up action and frame by frame rewind action is accomplished manually in this camera. Thus, it is necessary separately to provide an operating member to drive the take-up reel during the continuous winding action, and an operating member to drive a magazine shaft during the frame by frame rewinding operation. Therefore, the drive power transmission arrangement in the film feed mechanism of such a camera, as well as the feed direction selection action, become complicated. This leaves great possibilities for errors in handling and operation.

Moreover, there are many disadvantages which arise as a result of the aforementioned feeding action being accomplished manually. That is, as each opeating mode is changed by the photographer's manually and continuously taking up the film and then rewinding it frame by frame into the camera, unless the photographer is thoroughly familiar with the operating procedures of the camera, correct operation of the camera is very difficult. Also, when the film is rewound for exposure, unless the photographer is very cautious about the amount of film left unexposed, the possibility exists that the film leader portion which has already been exposed during loading of the film into the camera, that is, the portion that was taken out of the film magazine before loading, may be used for a photographic exposure. Therefore, with such a camera, the photographer has to confirm the state of each operating member and the amount of unexposed film as indicated by a film counter. This makes handling of such a camera very complicated.

SUMMARY OF THE INVENTION

The present invention is made in view of the above, and an object thereof is to provide a camera in which feeding of film is done by the driving power of a motor and a driving of the motor is controlled depending on the conditions in the camera. Thus, operation of a camera is automatically controlled and photography is done as film is being rewound in a reliable manner by simple handling.

Another object of the presnt invention is to provide a camera in which exposures are made as film is being rewound and when the film rewinding reaches the leader portion of the film, the film is continuously rewound thereafter.

Still another object of the invention is to provide a camera in which photography is performed as film is being rewound and the operating mode of the camera switched automatically from loading of the film into the camera until rewinding of the film is completed.

Further objects of the present invention shall be made apparent by detailed explanations of the embodiments to be shown below.

DETAILED DESCRIPTION OF PREFERRED EMBODIMENTS

The following are detailed explanations of the present invention which refer to the examples shown in the drawings.

Figure 1:
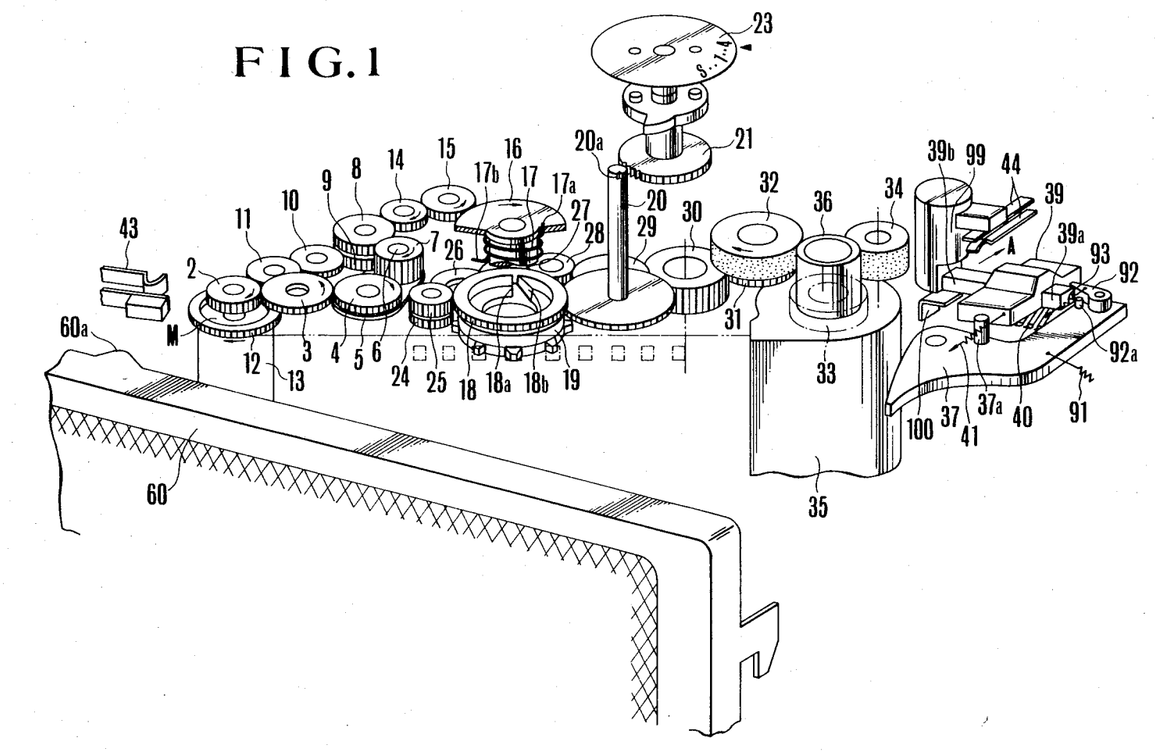
FIG. 1 is a perspective view showing a first example of a camera in which photographing of scenes is done as film is being rewound to the present invention.

In FIG. 1, a driving motor M has a gear 2 on its rotation shaft. An idler 3 serves to transmit driving power of the motor M to a gear 4. A lever 5 which is supported at a supporting shaft of the gear 4 in a freely rotatable manner is rotatable independent of the gear 4, and a shaft 6 is fixed at an end of the lever 5. A clutch gear 7 which meshes with the gear 4 is attached to the shaft 6 and is freely rotatable. Gears 8 and 9 engage the gear 7, and the gear 8 transmits driving power to a sprocket system while the gear 9 transmits the same to a spool system. Members 10 and 11 are idlers, and 12 is a spool gear meshing with the idler 11 and integrally rotating with the spool 13. Gears 14 and 15 are idlers and the idler 15 engages with a sprocket clutch gear 16. A spring 17 is a clutch spring having bent parts 17a and 17b, and the bent part 17a is inserted into a hole of the clutch gear 16 and is fixed thereat. A sprocket gear 18 rotates co-axially with the clutch gear 16 and has a projection 18a and a cam part 18b at its inside. The projection 18a is engageable with the bent part 17b of the clutch spring 17, while the cam part 18b serves to shift the bent part 17b in the upward direction in the drawing. The sprocket 8 is connected to a charging mechanism of a shutter or an automatic focusing detection device (AF) to be described below and to a motor control mechanism for advancing a film for a prescribed length. Member 19 is a sprocket and rotates integrally with the sprocket gear 18, which further engages with perforations of the film for causing film advancement for a prescribed length. Gear 20 is a counter driving gear meshing with the sprocket gear 18 and has a driving recess 20a. Member 21 is a counter ratchet wheel which engages the recess 20a and is made to be advanced one tooth by one rotation of the counter gear 20, and 23 is a counter scale plate. Gears 24 and 25 are positioned to be able to engage the clutch gear 7, and the gear 24 serves for driving the film take up reel of the film magazine during the rewinding action while the gear 25 is for driving the sprocket during the film rewind and meshes with the sprocket gear 18. Driving idlers 26, 27, 28, 29 and 30 drive the film take up reel of a magazine 35 when rewinding. What is shown as 31 is a driving gear of a friction roller 32. The magazine 35 has a film take up reel 36 which is driven by friction rollers 32, 33 and 34. Member 37 is a detection lever to detect a presence of a magazine and is pulled by a spring 91, and 39 is a change over knob being pulled by a spring 41. A contact piece 40 which shifts while contacting a base plate (not shown) is attached, while electrically insulated from the change over knob 39, to a bottom plane of said change over knob 39. Also, the base plate has a connecting pattern similar to a base plate 79 to be described later in reference to FIG. 8.

An engaging piece 92 which is supported in a freely rotatable manner at a shaft planted at the detection lever 37 is biased by a spring 93. And this engaging piece 92 engages a restraint pin 92a as shown in the drawing and its rotation in the counterclockwise direction is restricted. A projection 39a of the change over knob 39 engages the engaging piece 92 when the change over knob 39 is shifted to the direction of an arrow A, while a projection 39b engages a shutter button 99 in the state shown in the drawing. Also, in the state shown in the drawings, the change over knob 39 engages a pin 37a mounted on the detection lever 37 and has its shifting to a biased direction prohibited. Element 44 is a switch which is closed by pressing down the shutter button 99, and 100 is a lever to release a binding of a shutter mechanism snot shown in the drawing to start a shutter operation, and a switch 43 is a switch which is closed when a back lid 60 is closed.

Figure 9:
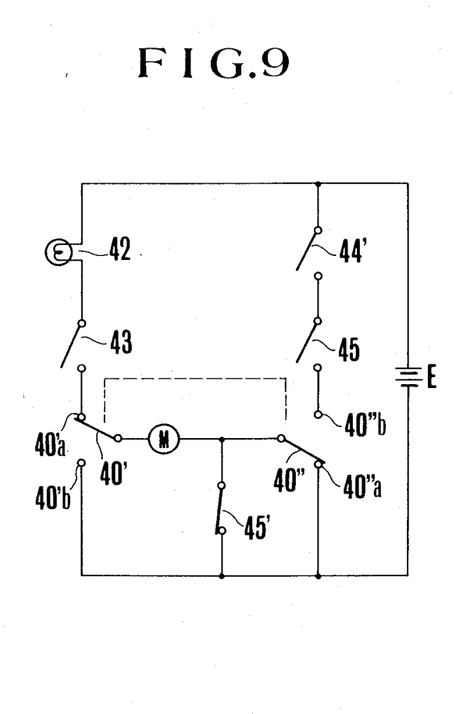
FIG. 9 is a circuit diagram of a motor control circuit of the example shown in FIG. 1 and FIG. 2.

FIG. 9 shows a motor control circuit in the example shown in FIG. 1, and includes a power source E and a motor M which rotates in a normal or a reverse direction depending on the power supply direction. Member 42 is a display element (for example, a lamp emitting light by power supply or a sound producing body such as a piezo-electric element may be used) connected between a switch 43 closed as the back lid 60 is closed and the power source E and member 44′ is a switch for retaining a power source closed only during a prescribed sequence or for a prescribed period of time as a switch 44 is turned on by pressing a shutter button. Element 45 is a switch connected to the switch 44′, while element 45′ is a switch to short-circuit the motor M. In the arrangement shown in FIG. 6 to be described later, the switch 45 is closed as rewinding for a prescribed length is started and is opened when the prescribed length rewinding is completed, while the switch 45′ is opened by start of the rewind for a prescribed length and is closed as the prescribed length rewinding operation is completed in a manner reverse to that of the switch 45′. Change over switches 40′ and 40″ are changed over by the contact piece 40 shown in FIG. 1, and contact points 40′a and 40″a are contacted, or contact points 40′b and 40″b are contacted depending on the position of the change over knob 39, and a power supply direction to the motor M is changed over thereby.

Figure 3:
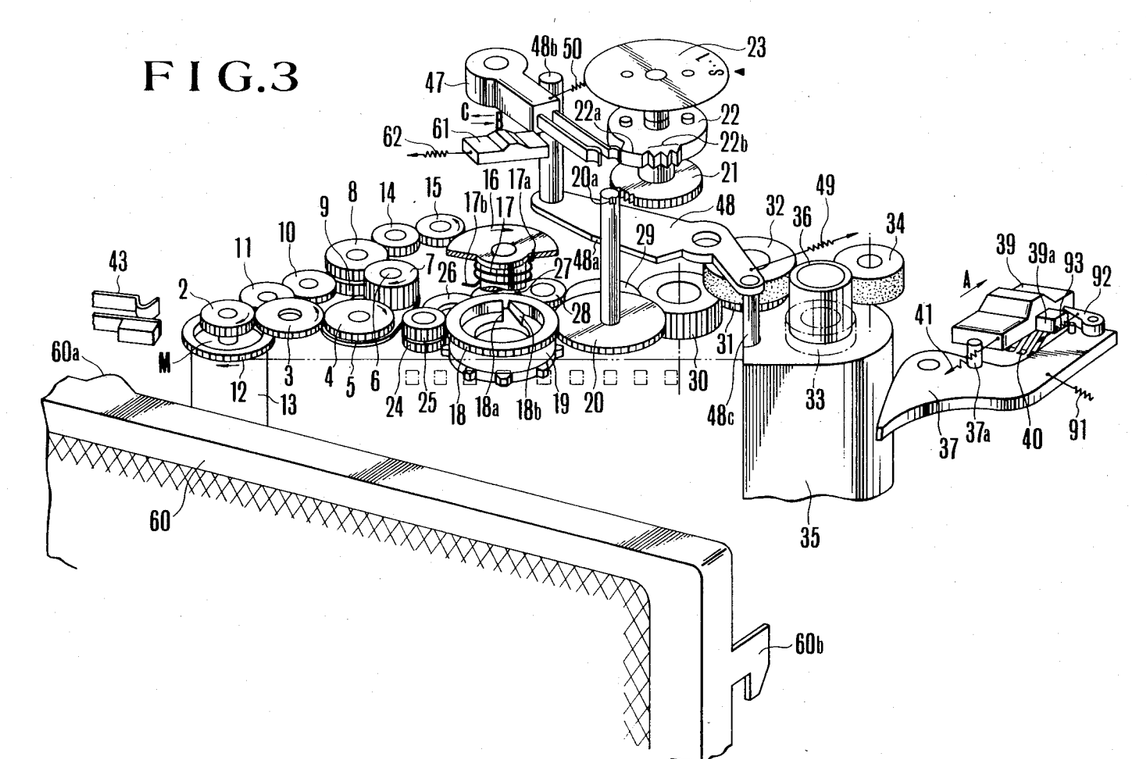
FIG. 3 is a perspective view of a third example of the present invention.
Figure 4:
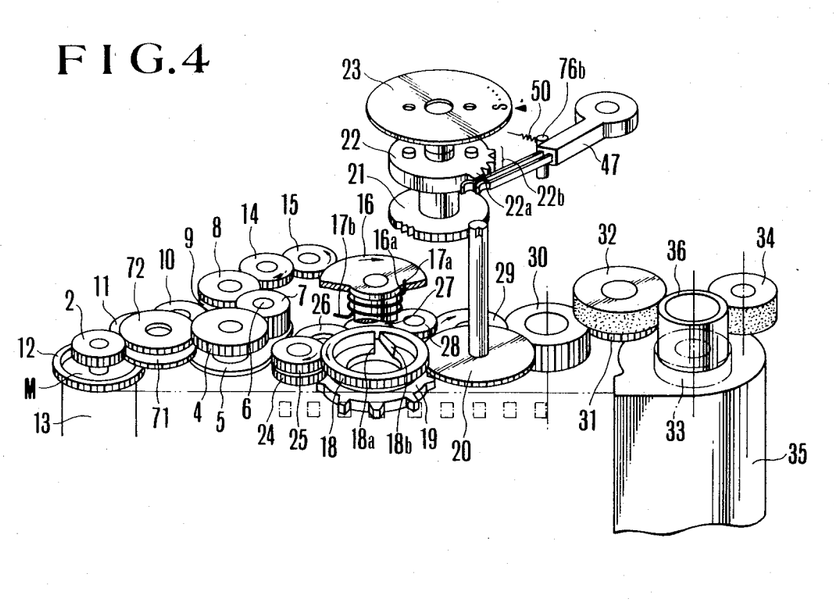
FIG. 4 is a perspective view of a fourth example of the present invention.
Figure 5:
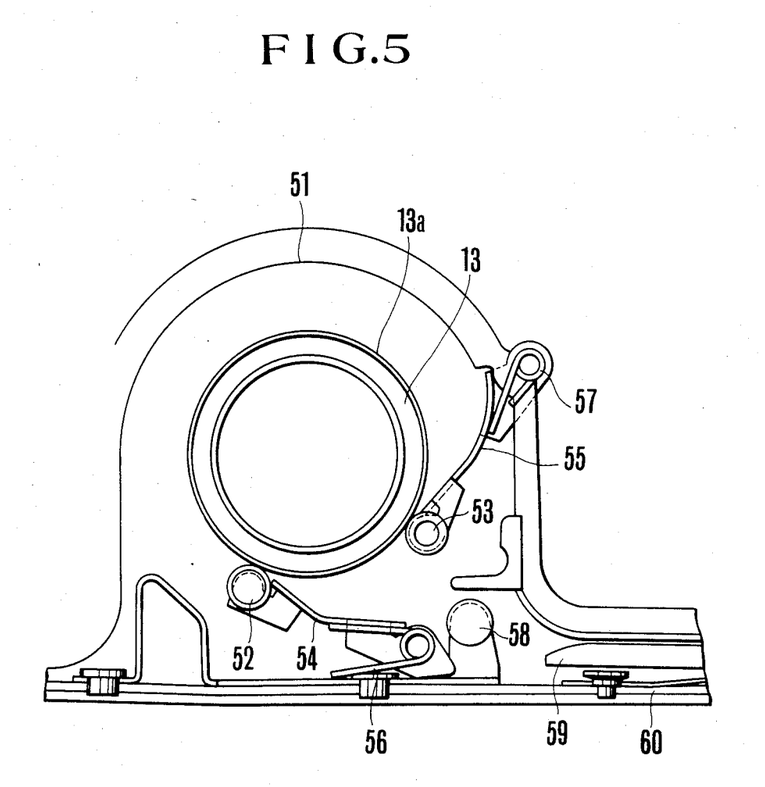
FIG. 5 is a plan view showing a take-up mechanism in each of the examples of the present invention.
Figure 6:
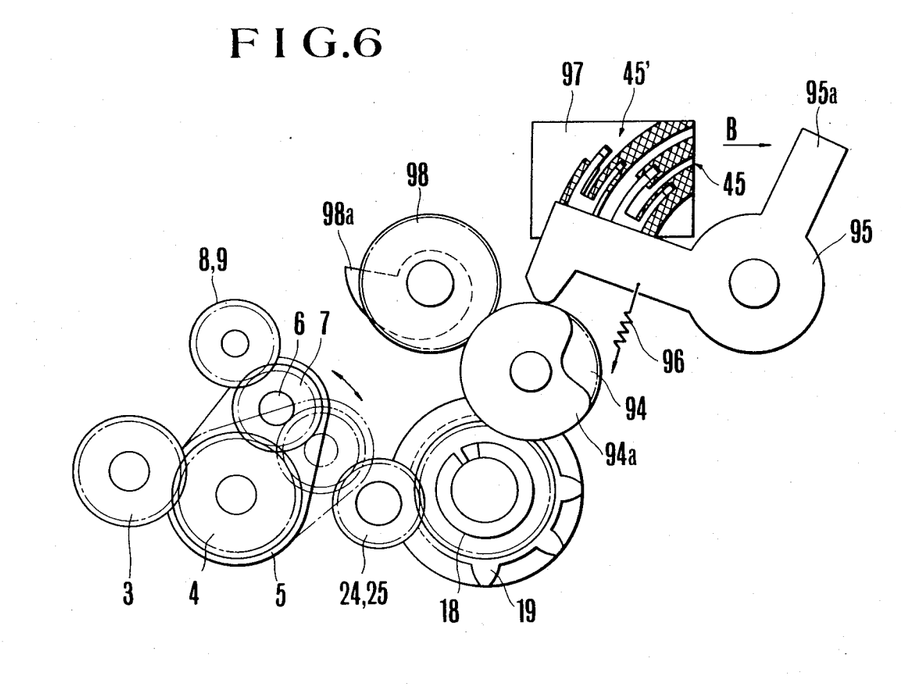
FIG. 6 is a plan view showing details of a power transmission mechanism in each example of the present invention.

FIG. 5 and FIG. 6 show a take up mechanism and a power transmission mechanism in each of the examples of FIG. 1 to FIG. 4. In FIG. 5, member 13 is a spool having a friction member 13a wound around the same and member 51 is a spool chamber inner wall, while rollers 52 and 53 guide the film that has been fed to a circumference of the spool 13 and are axially supported at holding down members 54 and 55 respectively and are pressed against the spool 13 by springs 56 and 57. Member 58 is a guide roller and 59 is a pressure plate.

Also in FIG. 6, what is shown as 94 is a prescribed length forwarding gear which is engageable with a sprocket wheel 18 and has a cam 94a provided at its upper part, and a prescribed length forwarding lever 95 being pulled by a spring 96 that abuts on said cam 94a. Two contacting pieces are bonded to said prescribed length forwarding lever 95 and electrically insulated from said lever, and as the contacting pieces move while contacting with a base plate 97, they perform the function of the switches 45 and 45′ shown in FIG. 9. A charging gear 98 of a shutter mechanism or an automatic focusing mechanism engages the prescribed length forwarding gear 94, and a charging member not shown in the drawing is actuated by a cam 98a provided below the same.

The following is an explanation of the operation of the first example having the above-mentioned structure.

When the film magazine 35 is not loaded in the camera, and the magazine detection lever 37 is rotated clockwise by being pulled by the spring 91, the pin 37a provided on the detection lever 37 moves forward as shown in the drawing, and the change over knob 39 is pulled by the spring 41. The switches 40′ and 40″ (refer to FIG. 9) which are changed over by the contacting piece 40 then touch the contacts 40′ and 40″b. When the shutter button 99 is now pressed, the switch 44′ is closed. Then after the automatic focusing mechanism and the shutter mechanism are actuated, a member (not shown in the drawing) associated with a closing action of the shutter moves the fore end 95a of the prescribed length forwarding or advance lever 95 shown in FIG. 6, and the motor control switch 45 for advancing a prescribed length of film is closed, while the switch 45′ is opened. By this current flows as E→44′→45→40″b→M→40′b→E, the motor rotates clockwise. This also rotates the gear 4 and the lever 5 clockwise so the clutch gear 7 meshes with gears 24 and 25. The sprocket 19 and the friction rollers 32, 33, 34 now rotate in a rewinding direction (a direction to feed the film towards the magazine 35). During the above action, charging of the shutter mechanism and the automatic focusing mechanism is accomplished by the charging gear 98. And upon a completion of the charging of the shutter mechanism, in association with the above-mentioned shutter closing action, a member which is not shown in the drawing but has rotated the prescribed length advancing lever 95 clockwise is withdrawn. After that, as the prescribed length forwarding gear 94 performs one rotation, the prescribed length forwarding lever 95 is rotated by the biasing power of the spring 96 so that it engages with the recess of the cam 94a, then the switch 45 is opened and power supply to the motor M is stopped. At the same time, as the switch 45′ is closed, a connection is completed through M−40′b−45′−M, the motor is short-circuited and is suddenly stopped.

Next, as the magazine 35 is loaded in this condition, the detection lever 37 is rotated counterclockwise by the magazine 35. At this time, since the change over knob 39 is pushed by the pin 37a on the detection lever 37 and is moved in the directon A, the contacting piece 40 is also moved in the direction A on a base plate not shown in the drawing and the switches 40', 40" are switched from the contacts 40'b, 40"b to the contacts 40'a, 40"a. This cuts off a circuit for the clockwise rotation of the motor M and the state shown in FIG. 9 is secured. Therefore, even if the shutter button 99 is pressed to close the switch 44', power will not be supplied to the motor M. Therefore, if the shutter button 99 is inadvertently pressed when the magazine 35 is loaded, the sprocket 19 and the friction rollers 32, 33, 34 will not accidentally rotate in the rewinding direction and take up the leader portion of the film into the magazine 35.

Also, since the projection 39b of the change over knob 39 is moved to a position allowing it to engage the notch in the shutter button 99 as the magazine 35 is loaded, the camera with said arrangement cannot initiate an action of the shutter mechanism, etc. through the lever 100.

When the fore end of a film is now placed on the spool 13, and the back lid 60 is closed, the switch 43 is closed by a projection 60a on the back lid 60. Current flows as follows: E→42→43→40'a→M→40"a→E, so the motor M is rotated counterclockwise. This also moves the gear 4 and the lever 5 counterclockwise and the clutch gear 7 meshes with the gears 8 and 9. Now the spool gear 12 and the sprocket clutch gear 16 rotate in a direction to wind the film around the spool 13. Since the spool 13 has no power to pull the film in the initial stage of a film wind up, the sprocket 19 is driven clockwise as the bent part 17b of the clutch spring 17 wound to the sprocket clutch gear 16 pushes the projection 18a at the inside of the sprocket gear 18. This pushes the film into a spool chamber 51 and a fore end of the film is taken up between the roller 52 and the spool 13. The fore end of the film which has passed the roller 52 once comes off the spool 13, but is pressed against the spool 13 again by the roller 52. The fore end of the film coming out of the roller 53 tends to come off the spool 13 again, but as the next film has already been fed thereto, it goes under the roller 52 to be pressed against the spool 13. As the same process is repeatedly continued, the film is tightly wound onto the spool 13 by friction between the friction member 13a wound to a periphery of the spool 13 and the film.

Also, since the peripheral speed of the spool 13 in this example is set to be faster than the peripheral speed of the sprocket 19 as driven by the sprocket clutch gear 16, after the film has been wound to the sprocket 13, the peripheral speed of the projection 18a becomes faster than the peripheral speed of the bent part 17b, and the rotation of the sprocket clutch gear 16 is not transmitted to the sprocket 19. Therefore, after the film is wound around the spool 13, the film will be advanced only by the rotating power of the spool 13. That is, in this state, the sprocket 19 is not driven by the bent part 17b of the clutch spring 17, but is driven by the film, so a so-called spool drive will occur. Therefore, the bent part 17b of the clutch spring 17 may abut against the cam part 18b of the sprocket gear 18, but as the bent part 17b in this case rides on a slanted plane of the cam 17b, it resists the biasing power of the clutch spring 17 and drops in the left of the projection 18a, there will be no problems. If an arrangement is employed in which the peripheral speed of the spool 13 is made slightly slower than the peripheral speed of the sprocket 19 and then faster than the peripheral speed of the sprocket 19 when the film has been wound around the spool 13 and the wound diameter of the spool 13 reaches a prescribed level, it is possible to make the initial portion of the film wind up by driving a sprocket, thereby making the windup sure and reliable.

Also, since power is supplied to the display element 42 during the period of time the motor M. is performing a continuous wind up, it is possible to confirm, for example, by lighting a lamp, etc. that the camera is in a continuous wind up mode. And since the prescribed length forwarding gear 94 also rotates during the continuous wind up, the switches 45, 45' repeat an opening and a closing movement, therefore there will be a case when current flows as M→45'→E, but there will be no harm at all from a practical point of view.

When the wind up of the film onto the spool 13 is completed, and the change over knob 39 is further moved to the direction A, the projection 39b retracts from the position engaged with the notch of the shutter button 99 thus allowing operation of the lever 100 by the shutter button. At the same time the projection 39a moves, pushing the engaging piece 92 and the projection 39a, the engaging piece 92 stops the change over knob 39 at a position resisting the biasing power of the spring 41. This makes the switches 40' and 40" shown in FIG. 9 again come into contact with the contacts 40'b and 40"b. Therefore, the camera is placed in a state in which an exposure is made as the film is rewound into the magazine 35 one frame by one frame as when the the magazine is not loaded in the camera. Also, operations in this case are the same as in the case described before. Therefore, explanations are not repeated here.

Also, when the back lid 60 is opened after exposure of all frames has been completed and the magazine 35 is taken out, the magazine detection lever 37 rotates clockwise in response to the biasing power of the spring 91. This releases the engagement of the engaging piece 92 with the projection 39a of the change over knob 39. Therefore, the change over knob 39 is returned to its initial position by the biasing power of the spring 41. In this case, although the switches 40' and 40" momentarily touch the contacts 40'a and 40"a respectively in response to the return of the change over knob, the back lid 60 is opened and the switch 43 is opened, so that power will not be supplied to the motor M.

Figure 2:
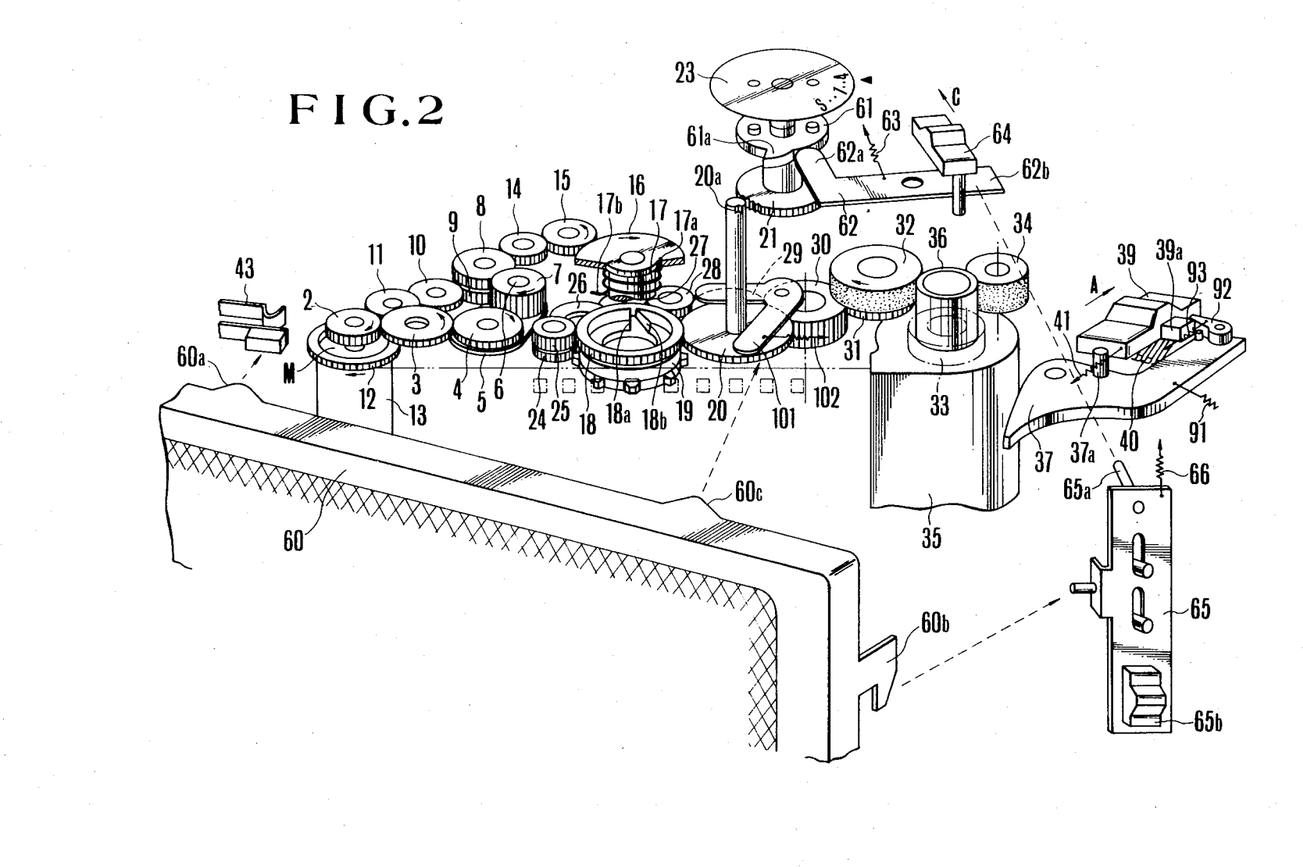
FIG. 2 is a perspective view of a second example of the present invention.

Next, FIG. 2 shows the second example of the present invention, and is different from the example of FIG. 1 in that an opening and closing mechanism for the back lid 60 is added.

In this drawing, 23 is a counter scale on an upper plane of which figures indicating a number of film left unexposed are marked, and 61 is a cam integrally rotating with the counter scale 23. Further, a check lever 62 is placed for engaging the cam 61 and in a rotatable manner. This check lever 62 is pulled by a spring 63 and comes in contact with the periphery of the cam 61 at its fore end 62a. A claw 60b is formed at the back lid 60, and a back lid opening and closing member 65 which engages the claw 60b to retain the back lid 60 at a closed position is positioned to be able to be moved up and down against the main camera body. While the opening and closing member 65 is always pulled by a spring 66 and engages with the claw 60b on the back lid 60 to retain the back lid at the closed position, as it is pushed downward through an operating part 65b, it is released from the engaged state with the claw 60b to release the back lid. A pin 65a is integrally provided at the back lid opening and closing member 65.

The check lever 62 is rotated counterclockwise against the force of a spring 63 as its fore end 62a comes over the projection 61a of the cam 61 when the magazine 35 is not loaded or when the film has been rewound into the magazine 35, that is, when the counter scale 23 is at a position to indicate "S", but when the film has not been rewound into the magazine 35, that is, when the counter has not been returned to the position S, the fore end 62a comes off the projection 61a of the cam and the check lever 62 rotates clockwise to have its end 62b come under a pin 65a of the above-mentioned opening and closing member 65. Thus, this check lever 62 blocks the movement of the back lid opening and closing member 65 when the film has not been rewound into the magazine 35. Also, a change over knob 64 which can be operated from outside is provided for releasing the blocking of the opening of the back lid 60 by said check lever 62 whenever desired. That is, by moving the change over knob 64 to the direction C, checking of the check lever 62 can be released.

Also, while the counterclockwise rotating power is always applied to the counter scale 23 by a spring not shown in the drawing, when the back lid 60 is closed, a shaft fixed to the counter gear 20, by the force of a spring not shown, enters and engages claw teeth of the counter ratchet wheel 21, so the counterclockwise rotation of the counter scale 23 is restricted. Also, the counter scale 23 is rotated as the counter ratchet wheel 21 and the recess 20a of the counter gear 20 engages each other. A counter turning or return lever 101 is pulled by a spring 102 and as the back lid 60 is opened, one end of the lever 101 presses the shaft fixedly provided on the counter gear 20 to release the engagement between the counter gear 20 and the counter ratchet wheel 21. What is shown as 60C is a projection provided at the back lid 60 and abuts on one end of the counter returning lever 101 to rotate the lever clockwise against the biasing power of a spring 102, when the back lid 60 is closed.

Other parts and a motor control circuit in this example are the same as those shown in FIG. 1, so that explanations therefor will not be repeated here. The operation of this example is as follows:

When the magazine 35 is not loaded, and as the magazine detection lever 37 is pulled by the spring 91 and rotates in the clockwise direction, the switches 40' and 40" shown in FIG. 9 touch the contacts 40'b and 40"b as in the previous example. Then when a shutter button not shown in the drawing of this example is pressed, the switch 44' is closed for a prescribed period of time and at the same time the switch 45 is closed while the switch 45' is opened upon completion of the operation of the automatic focusing mechanism and the shutter mechanism. Therefore, current flows through E→44→45→40"b→M→40'b→E, and the motor M rotates clockwise. Now, the gear 4 and the lever 5 rotate clockwise and the clutch gear 7 meshes with the gears 24, 25, and the same operation as in FIG. 1 follows.

When the back lid 60 is opened at this time, the counter return lever 101 is pulled by the spring 102 and rotates counterclockwise to release the engagement between the counter gear 20 and the counter ratchet wheel 21. Therefore, the counter scale 23 is retained at a position to indicate "S" (hereinafter referred to as S position). When the back lid 60 is closed, as the projection 60c of the back lid 60 presses the counter return lever 101, the counter gear 20 and the counter ratchet wheel 21 engage each other. When a shutter button is pressed and the sprocket 19 moves in the rewind direction, rotation in the direction to be further rewound from the S position is applied to the counter ratchet wheel 21. However, as a stopper (not shown) is provided at the counter ratchet wheel 21 to prevent its rewind movement beyond the S position, the counter scale 23 is retwained at the S position. In either case, when the magazine 35 is not loaded, the counter scale 23 will be at the S position, and a fore end 62a of the check lever 62 is retained in a state as coming over the projection 61a of the cam 61. Therefore, the other end 62b thereof comes off the pin 65a of the opening and closing member 65 so a condition in which the opening and closing member 65 can be moved is secured.

When the magazine 35 is loaded, after that, and the back lid 60 is closed to start a film take up action, the rotation of the counter gear 20 is transmitted to the counter ratchet wheel 21, so the counter scale 23 and the cam 61 rotate clockwise according to the rotation of the sprocket 19. Now, the counter scale 23 indicates a number of frames of the film taken up by the spool 13, andthe cam 61 has the engagement of its projection 61a and the fore end 62a of the check lever 62 released to rotate the check lever 62 in the clockwise direction. (The state shown in FIG. 2.) Therefore, at this time, the other end 62b of the check lever 62 comes under the pin 65a of the opening and closing member 65 to prohibit the opening and closing of the back lid 60. Hence, it is possible to prevent an accident in that the back lid 60 opens inadvertently while the film is outside the magazine 35 and exposes the film. Also, as in the previously mentioned example, a photographic action is made while the film is rewound into the magazine 35.

When the magazine 35 is taken out in the course of photography, as the change over knob 64 is moved to the direction C, the check lever 62 moves counterclockwise and the fore end 62b of the check lever 62 will not block the movement of the opening and closing member 65, thus the back lid 60 can be opened. Further, when photography of all frames has been completed, the counter scale 23 is returned to the S position again and one end 62a of the check lever 62 comes over the projection 61a of the cam 61. Thefefore, the engagement of the other end 62b thereof and the pin 65a is released, allowing operation of the opening and closing member 65.

While the above-mentioned example is such that when the film is not rewound into the magazine 35, the check lever 62 blocks the movement of the opening and closing member 65 to obtain a signal from the cam 61 associated with the counter. This check lever 62 may be made to function by detecting the presence of film wound around the entrance of the spool chamber.

Next, FIG. 3 illustrates a third example of the present invention, and in this example, member 22 is a switch drum integrally rotating with the counter ratchet wheel 21, and 47 is a switch biased counterclockwise by a spring 50, and an end thereof comes into contact with projections 22a, 22b of the switch drum 22, thereby closing the switch 47. A detection lever 48 is biased in the counterclockwise direction by a spring 49 and has a detection pin 48c to detect a presence of the magazine 35, and a side plane 48a pressure contacting a shaft part of the counter gear 20, as well as a pin 48b to rotate the switch 47 clockwise. The lever 48 rotates counterclockwise from the position shown in the drawing in response to the biasing power of the spring 49 when the magazine 35 is not loaded. Also, at this time, meshing of the counter gear 20 and the counter ratchet wheel 21 is released while the switch 47 is rotated clockwise and the fore end thereof retracts from a position enabling the fore end of the same to contact with the projection 22a, 22b of the drum 22. A change over knob 61 is operated from outside to close the switch 47 and is biased in the direction of the arrow C by a spring 62.

Figure 10:
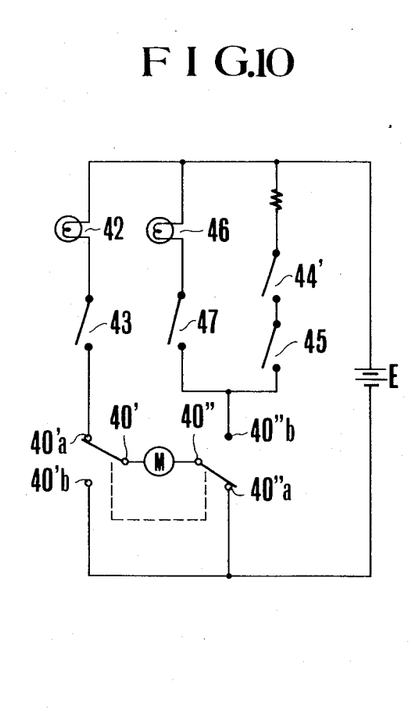
FIG. 10 is a circuit diagram of a motor control circuit of the example shown in FIG. 3.

FIG. 10 is a motor control circuit diagram in this example, and is different from the circuit of FIG. 9 in that a lamp 46 and a switch 47 are provided. That is, in this circuit, the switch 47 of FIG. 3 is provided through the lamp 46 between the power source E and the contact 40″b of the switch 40″, and a driving of the motor M can also be controlled by the switch 47. And as the other arrangements are the same as in the example of FIG. 1 described before, explanations therefor are not repeated here.

The operation of this example is as follows.

When the magazine 35 is not loaded, since the magazine detection lever 37 is pulled by the spring 91 and is rotated to the clockwise direction, the pin 37a provided on the detection lever is withdrawn and the change over knob 39 is pulled by the spring 41. Therefore, as the switches 40′, 40″ which are changed over by the contacting piece 40 touch the contacts 40′b, 40″b, and a shutter button is pressed to close the switch 44′ for a prescribed period of time and a picture is taken, current flows through E→44′→45→40″b→M→40′b→E as the photographic action is completed and the switch 45 is closed. Then the motor M rotates in a direction for rewinding the film. When the cam 94a in the mechanism for forwarding a prescribed length of film as shown in FIG. 6 rotates once, the switch 45 goes off and driving of the motor M is stopped. At this time, the detection lever 48 also rotates counterclockwise in response to a spring 49 and the meshing of the counter gear 20 and the counter ratchet wheel 21 is released by the side plane 48a. Therefore, the counter scale 23 is retained at the position S by a spring not shown in the drawing. Therefore, even if the sprocket 19 rotates, the rotation will not be transmitted to the counter ratchet wheel 21 and the counter scale 23 reamins retained at the position S. Also, since the switch 47 is rotated clockwise by a pin 48b of the detection lever 48, it is placed at a position not in contact with the projections 22a, 22b. Further, at this time, the change over knob 61 is pulled by the spring 62 and is placed at a position not engaging the switch 47. When the magazine 35 is loaded, next, the detection lever 37 is pressed by the magazine 35 and rotates to the counterclockwise direction, and the change over knob 39 is pressed by the pin 37a and is moved to the direction A. By this, the contacting piece 40 is also moved and the switches 40′, 40″ touch the contacts 40′a, 40″a. When the fore end of the film is placed on the spool 13 and the back lid 60 is closed, the switch 43 is closed by the projection 60a of the back lid and current flows as E→42→43→40′a→M→40″a →E, then the motor rotates to the counterclockwise direction, continuously winding up the film around the spool 13. Also the function at this part is the same as that in the example shown in FIG. 1 described above.

Also, since the detection lever 48 rotates to the clockwise direction resisting the biasing power of the spring 49 when the magazine 35 is loaded, the counter gear 20 and the counter ratchet wheel 21 are in a meshed state at this time. Therefore, at the above-mentioned continuous film wind up, the rotation of the sprocket 19 is transmitted to the counter scale 23, and an indicated number of frames at the counter scale 23 increases according to the number of film frames having been advanced. Also, the switch drum 22 rotates to the clockwise direction from the positon shown in the drawing in association with said counter scale 23.

On the other hand, the switch 47 rotates to the counterclockwise direction by the loading of the magazine 35 and the fore end thereof is retained at a position allowing the same to contact the projections 22a, 22b of the switch drum 22.

When a film wind up is completed, as the change over knob 39 is further moved to the direction A, the knob 39 moves as its projection 39a pushes over the check pin 92. Then, after that, even if the knob 39 is pulled by the spring 41, it is checked by the check pin 92, and the switches 40′, 40″ touch the contacts 40′b, 40″b again. The camera thus makes the same function as when the magazine 35 is not loaded. Thus a rewinding of the film one frame by one frame can be made as photography is being done. At this time, the counter scale 23 is also rotated to the counterclockwise direction returning its indication one frame by one frame.

Figure 7A:
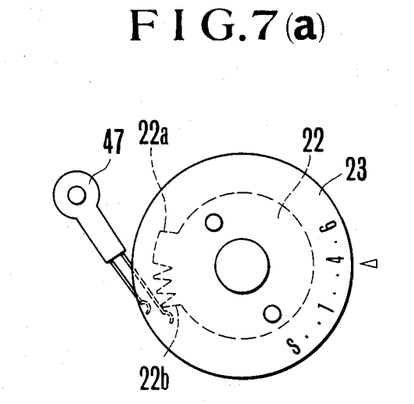
FIGS. 7(a), (b), (c) and (d) are plan views showing the change over mechanism in the example shown in FIG. 3.
Figure 7B:
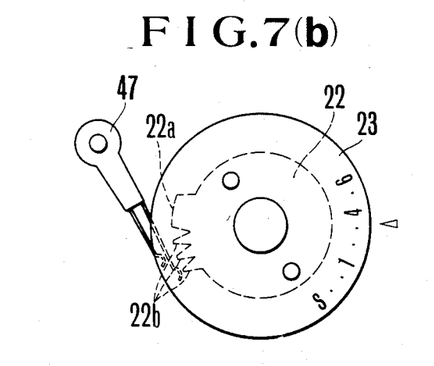
Figure 7C:
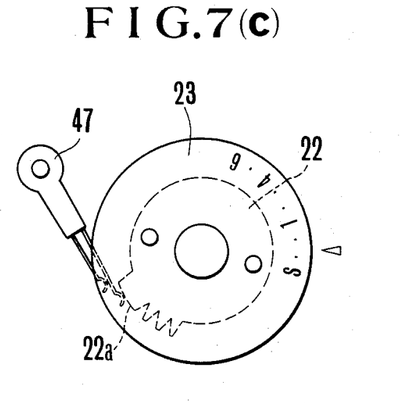
Figure 7D:
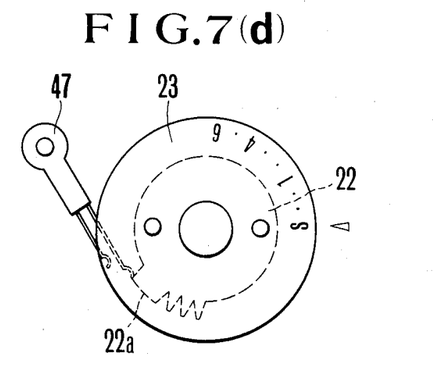

While the counter scale 23 is consecutively rotated as photography advances, the switch 47 is left opened until the counter scale 23 comes to a position shown in FIG. 7(a). However, as the photography advances and a number of frames left unexposed becomes, for example, three frames, the switch 47 comes over the projection 22b of the switch drum 22 as shown in FIG. 7(b), while the counter scale 23 is in operation, therefore, the lamp 46 is lighted. Since the switch 47 is opened at this position before a rewinding of one frame is completed, power will not be left supplied to the motor M after one frame rewinding is completed. As the lamp 46 is lighted only when the counter scale 23 is in action as mentioned above, a warning that a number of frames left unexposed is minimal can be given. When the film on which the photograph can be made has been used up, the switch 47 comes over the projection 22a of the switch drum 22 as shown in FIG. 7(c). Therefore, current flows as E→46→47→40″b→M→40′b→E and the lamp 46 is lighted and, at the same time, the motor M rotates making a continuous rewinding of the film leader portion. As the sprocket 19 also rotates during this time, the prescribed length forwarding switch 45 is opened and closed, there will be no effect on power supply to the motor M. The continuous rewinding will be completed at a position at which the projection 22a of the switch drum 22 is finished, then the prescribed length forwarding switch 45 is opened as shown in FIG. 7(d). By this, a portion which has been exposed by the time the magazine is loaded is continuously rewound and, at the same time, it becomes possible to stop the rewinding immediately before the fore end of the film is taken up into the magazine.

As the back lid is opened and the magazine 35 is taken out, after that, the magazine detection lever 37 rotates clockwise, then the change over knob 39 is returned to its initial position by the biasing power of the spring 41 as the checking of the check pin 92 stops. Also, at this time, the detection lever 48 rotates counterclockwise by the biasing power of the spring 49, and the counter gear 20 is pressed by the side plane 48a of the detection 48 and has its meshing with the counter ratchet wheel 21 released. Then, the switch 47 is pressed by the fore end 48b of the detection lever 48 and is made to escape to a position not in contact with the projections 22a, 22b of the switch drum 22.

When it is desired to discontinue photography and to continuously rewind the remaining film, the change over knob 61 is moved to the direction B. Then the switch 47 is closed and continuous rewinding is secured and a film rewinding is done. When the rewinding is completed and a finger is removed, the change over knob 61 is pulled by the spring 62 to the direction C and the switch 47 is opened stopping the motor M. By this, it will not be necessary to press the shutter button for a number of frames left unexposed, thus simplifying the operation.

Figure 8A:
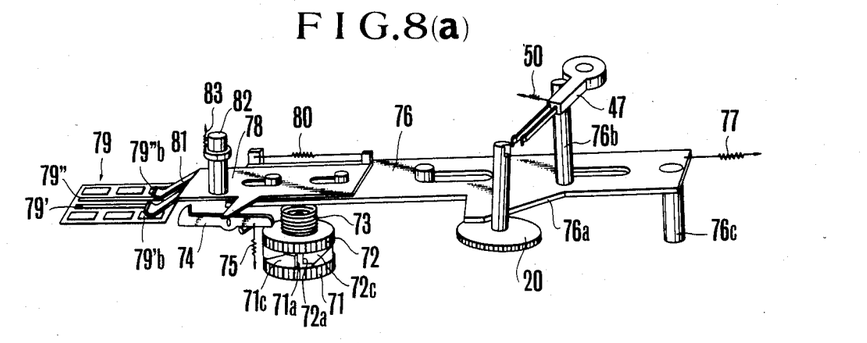
FIGS. 8(a), (b) and (c) are perspective views showing an example of the change over mechanism in the embodiment showin in FIG. 4 and the function thereof.
Figure 8B:
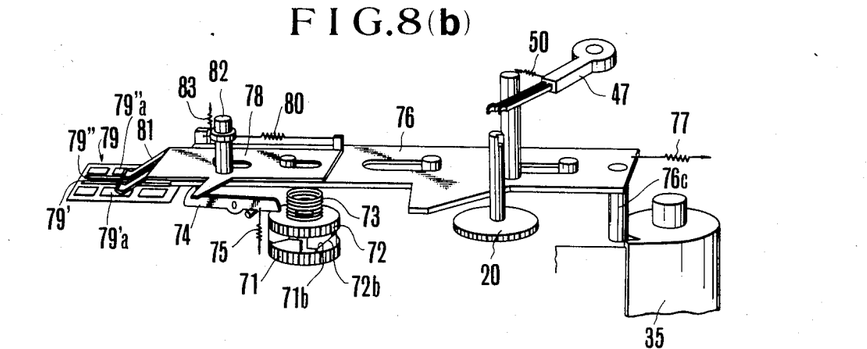
Figure 8C:
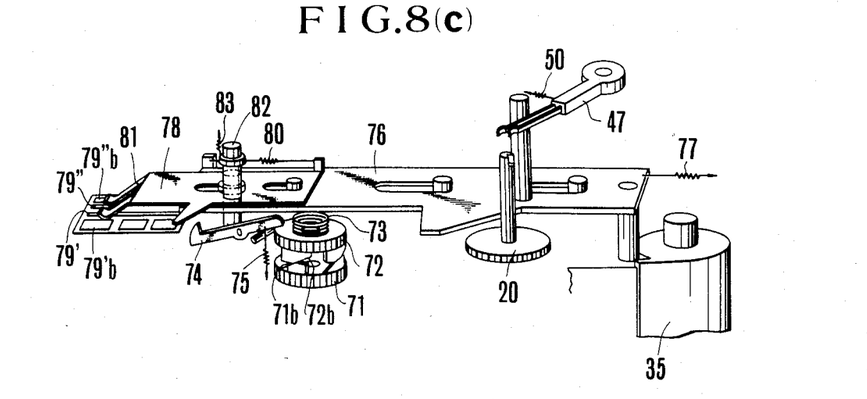

Next, FIG. 4 and FIG. 8 show the fourth example of the present invention and are different from each of the preceding examples in that a change over from a continuous wind up action to one frame rewinding is made automatically.

In these drawings (especially FIG. 8), gears 71 and 72 for torque detection are provided respectively in a freely rotatable manner and in a co-axial manner, wherein the gear 71 meshes with the gear 2 fixedly provided at a driving shaft of the motor M, and the gear 72 meshes with the gear 4. Also, a spring 73 biases the gear 72 downward in the drawing to restrict a shifting of the gear 72 in the axial direction.

A projection 71c having an end plane 71a and a slanted plane 71b is formed at the torque detection gear 71 and at the same time a projection 72c having an end plane 72a and a slanted plane 72b is formed at the torque detection gear 72, and as the motor M further continues to rotate after a continuous wind up of the film is completed, the projection 72c of the torque detection gear 72 comes over the projection 71c of the torque detection gear 71 through each of the slanted planes 71b, 72b, thus the gear 72 is pressed up resisting the spring 73. What is shown as 76 is a magazine detection lever to detect a loading of the magazine 35 in the camera and this detection lever 76 is positioned on the right in the drawing when the magazine 35 is not loaded as shown in FIG. 8(a), and when the magazine 35 is loaded in the camera, a pin 76c provided on the detection lever 76 engages with the magazine 35 and is retained at the position shown in FIG. 8(b). What is shown as 78 is a change over lever supported in a freely shiftable manner at the detection lever 76 and is biased to the left in the drawing by a spring 90 and is checked by a check lever 76 in the state shown in FIG. 8(b). This check lever 74 rotates counterclockwise resisting the biasing power of a spring 75 as the torque detection gear 72 is pushed upward, and releases the engagement with the change over lever 78.

A change over contacting piece 81 is provided at one end of the torque detection lever 78 and it comes in touch with each of contacts 79', 79'a, 79'b. 79'', 79''a, 79''b as it is shifted along a base plate 79 in a manner making a change over of a wind up mode and a rewinding mode, for varying a conductance state. What is shown as 82 is an operating button which rotates the check lever 74 at any desired time so that engagement of the change over lever 78 and the check lever 74 can be released. This operating button 82 is biased upward in the drawing by a spring 83.

Figure 11:
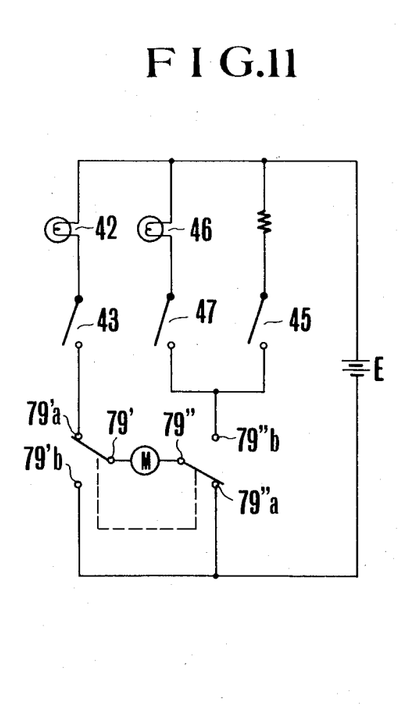
FIG. 11 is a circuit diagram of a motor control circuit of the example shown in FIG. 4.

Also, FIG. 11 is a motor control circuit diagram in the above example, and in the drawing, E is a power source, and M is a motor. Also, 42 is a lamp and 43 is a switch being closed as a back lid is closed, while 45 is a motor control switch for prescribed length rewinding is started, and is opened as the prescribed length rewinding is completed. What is shown as 46 is a lamp and 47 is a switch which is closed as it comes over the projections 22a, 22b of the switch drum 22 shown in FIG. 4. What are shown as 79' and 79'' are switches to be changed over by the contacting piece 81 shown in FIG. 8, wherein it comes to contacts 79'a, 79''a and wherein it comes to contacts 79'b, 79''b depending onthe positions of the magazine detection lever 76 and of the change over lever 78.

Other arrangements are the same as those in each of the examples described above, therefore explanations therefor will not be repeated.

Next, explanations will be made of a function of this example.

When the magazine is not loaded, as the magazine detection lever 76 is pulled by a spring 77 and is shifted to the right as shown in FIG. 8(a), the contacting piece 81 of the change over lever 78 is positioned at the right of a base plate 79 to connect the switch 79' to the contact 79'b side and to connect the switch 79'' to the contact 79''b side. When a shutter button is pressed under this state, the prescribed length forwarding switch 45 shown in FIG. 11 is closed after a photographic action is completed, and power flows as E→45→79''b→M→79'b→E, and the motor M rotates to the clockwise direction (a direction to rewind the film to the magazine 35). By this, the torque detection gear 71 rotates to the counterclockwise direction and as a projected end plane 71a of the torque detection gear 71 presses a projected end plane 72a of the torque detection gear 72, the torque detection gear 72 also rotates to the clockwise direction and at the same time the lever 5 rotates to the clockwise direction. And the clutch gear 7 meshes with the gears 24, 25 and the sprocket 19 and friction roller 32 rotate to a rewinding direction, and as the prescribed length forwarding cam 94a shown in FIG. 6 makes one rotation, the switch 45 is opened, then power supply to the motor M is stopped. Since the engagement between the counter gear 20 and the counter ratchet wheel 21 has been released by a cam plane 76a of the magazine detection lever 76 at this time, the rotation of the sprocket 19 will not be transmitted to the counter scale 23. Also, at this time, the switch 47 is rotated to the counterclockwise direction by a pin 76b planted on said lever, and the fore end thereof is retained at a position not contacting with the projections 22a, 22b of the switch drum 22.

Next, when the magazine 35 is loaded, as a pin 76c of the magazine detection lever 76 is pressed by the magazine 35 as shown in FIG. 8(b), the magazine detection lever 76 moves to the left. At this time, the change over lever 78 also moves to the left in association with said lever, and the change over lever 78 is checked by the check lever 78 at the position where the contacting piece 81 brings the switch 79' into contact with the contact 79'a, and brings the switch 79'' into contact with the contact 79''a. Also, a biasing power is accumulated at the spring 80 by the shifting of the magazine detection lever 76 thereafter. And when the fore end of the film is placed over the spool 13 from said state and the back lid is closed, the switch 43 is closed and power flows as E→42→43→79'a→M→79''a→E and the motor is rotated to the counterclockwise direction. By this, the torque detection gear 71 rotates to the clockwise direction and as a slated plane 71b of a projection 71c of the torque detection gear 71 presses a slanted plane 72b of a projection 72c of the torque detection gear 72, the torque detection gear 72 also rotates to the clockwise direction. By this, the gear 4 and the lever 5 also move to the counterclockwise direction and the gear 7 meshes with the gears 8, 9. By this, the spool gear 12 and the sprocket clutch gear 16 rotate to a direction to wind up the film around the spool 13.

Also, a continous film wind up action thereafter is the same as that in the preceding examples. Also, as the fore end of the switch 47 at this time is shifted to a position allowing contact with the projections 22a, 22b of the switch drum 22, and at the same time, the counter gear 20 and the counter ratchet wheel 21 are placed in a meshed state, an indicated number at the counter scale 23 increases according to the number of film frames taken up.

After that, when the film within the magazine 35 has been totally wound, the rotation from the spool gear 12 to the torque detection gear 72 will be restricted, but as the motor M tends to rotate evenly at this time, the slanted plane 72b of the torque detection gear 72 rides over the slanted plane 71b of the torque detection gear 71 as shown in FIG. 8(c) resisting the spring 73, thus the toreque gear 72 is pushed upward. Therefore, the check lever 74 rotates to the counterclockwise direction releasing the checking with the change over lever 78. By this, the change over lever 78 is pulled by a spring 80 and moves to the left, thereby shifting a contacting piece 81 to the left of a base plate 79 to close the contacts 79'b, 79"b again.

Now, when the cam 94a of FIG. 6 is not at a position of a prescribed length forwarding completion, here, as the switch 45 is closed, the motor M rotates to the clockwise direction and the torque detection gear 71 rotates to the counterclockwise direction. By this, the torque detection gear 72 is pressed by the spring 73 and is shifted downward in the drawing in a manner sliding over the slanted plane 71b of the torque detection gear 71, and the projection end planes 71a, 72a contact with each other, then the torque detection gear 72 starts a rotation to the counterclockwise direction. By this, the sprocket 19 and the friction rollers 32, 33, 34 rotate to a direction rewinding the film around the magazine 35, then when the cam 94a comes to a position at which the prescribed length rewinding is completed, the switch 45 is opened to stop the motor M. By this, photographic preparation is completed. Then, as a shutter button is pressed, the shutter and the AF mechanisms are actuated, thus a prescribed length rewinding of the film will be done.

And, when the cam 94a happens to be at a position at which the forwarding of the prescribed length of film is completed, at a moment the change over lever 78 moves, a shutter button is pressed and the above-mentioned change over of the gears is done at the time a prescribed length of film is forwarded after the shutter and the AF mechanisms are actuated. Thereafter, photography and one frame rewinding can be completed. Also, when it is desired to stop the continuous wind up of the film at a position at which a prescribed number of frames have been wound up, a button 82 is pressed to release the engagement of the check lever 74 and the change over lever 78 and to run the change over lever 78 to the left, then the above-mentioned change over will be done.

As photography proceeds and the number of frames left becomes, for example, three frames, the switch 47 rides over the projection 22b of the switch drum while the counter scale 23 is in action, (FIG. 7(b)). Therefore, the lamp 46 is lighted. However, since the switch 47 is opened before one frame rewinding is completed at this time, the motor M will not be placed in a state where power is supplied thereto even after one frame rewinding is completed.

Also, when the counter scale 23 comes to a position to indicate that the number of photographable number of frames is nil, the fore end of the switch 47 contacts with the projection 22a of the switch drum 22, (FIG. 7(c)) and the switch 47 is closed, then power flows as E→46→47→79"b→M→79'b→E and the lamp 46 is lighted and at the same time the motor M rotates, thus a continuous rewinding will be done. As the sprocket 19 also rotates at this time, the switch 45 for forwarding a prescribed length of film is opened and closed, but there will be no influence over the power supply to the motor M. The continuous rewinding will be terminated at a position where the projection 22a of the switch drum 22 is finished. Thus, a portion having been exposed by the time the magazine is loaded is rewound and the fore end of the film is stopped immediately before it is taken up into the magazine.

After that as the back lid is opened and the magazine 35 is taken out, the magazine detection lever 76 is pulled by a spring 77 and moves to the right in the drawing, then the contacting piece 81 returns to the right part of the base plate 79.

At the same time, the cam plane 76a and the pin 76b of the magazine detection lever 76 move to the right in the drawing, releasing the meshing of the counter gear 20 and the counter ratchet wheel 21, then the switch 47 comes outside of rotating radii of the projections 22a, 22b of the switch drum 22. Thus the camera is placed in an initial state again.

As has been explained in detail, the present invention relates to a camera in which photography is done as a film is being rewound, wherein a feeding of the film, etc. is done by a driving power of a motor and a driving of said motor is controlled depending on conditions in the camera. Thus, the operation of such a camera can be automatically controlled and reliable and sure photography can be made simple. That is, the present invention proposes to control power supply to the motor depending on the presence of film loaded, the state of opening and closing of the back lid, a variation in the torque of a take up shaft at the time of continuous take up of the film, and the indicating state of a film counter, etc., thus, all of the operations can be automated and the handling characteristics of such a camera can be improved. Also, according to the present invention, the following effects can be expected:

(a) Power supply to the motor is changed over to a wind up direction and to a rewinding direction depending on the presence of the film loaded, and when the power supply direction turns to the wind up direction by the loading of the film, the power supply is started by closing of the back lid. Therefore, there will be no possibility that the film is pulled out of the magazine with the back lid left open at the time the film is loaded resulting in an inadvertent exposure of the film or a leader portion of the film is rewound into the magazine by erroneous handling of the shutter button.

(b) As indicated, the power is being supplied to the motor, and a photographer can easily notice that the camera is in operation.

(c) At an intial stage of film wind up, the fiml is advanced by a sprocket driving, then the film is advanced by a spool driving after the film has been wound around the spool, therefore photographic preparation can be made without damaging the film.

(d) At the time of a continuous wind up of the film, that is when preparation for photography is done, a locking of the shutter button is done, thus a double exposure of the film can be prevented.

(e) Since opening and closing of the back lid is made possible depending on an indication by the counter, an erroneous exposure of the film can be prevented.

(f) When an exposed portion of the film is rewound, as the magazine is loaded, according to a photographic action, the film is continuously rewound into the magazine and said continuous rewinding is stopped when a fore end of the film is somewhat coming out of the magazine, thus there will be no fear that a photograph is taken where a portion has been already exposed at a time of film loading.

(g) Also, it is indicated that a number of frames of the film allowing photography is small at a position where a prescribed number of frames are still left unexposed before the above-mentioned state takes place, therefore a photographer does not have to exercise care always on the number of frames left, thus handling is improved.

(h) A change over from a continuous wind up to one frame rewinding is done by detecting a change in the torque of a take up shaft and at the smae time restoration of the change over means to the initial position is done according to the take out of the magazine, thus handling of a camera in which photography is done as the film is rewound can be further simplified.

What is claimed is:

1. A camera in which a film is continuously wound from the shaft of a film magazine loaded in the camera onto a spool in the camera, and then exposed frame by frame as the film is rewound into the magazine, said camera being operable with a direct power supply and comprising:
   motor means to drive the spool and the magazine shaft on the basis of the direction of the power supply, and
   a detection means to detect a loading of the magazine and to change the direction of the power supply to the motor from a direction for driving of the magazine shaft to a direction for driving of the spool.

2. A camera according to claim 1, further comprising: first switching means to turn on the power supply to the motor in response to closing of a back lid when the direction of power supply to the motor is set to the spool driving side.

3. A camera according to claim 2, further comprising: a display means to indicate that the power supply is turned on by the first switching means.

4. A camera according to claim 2, further comprising: a sprocket for energizing film;
   a one way clutch for receiving the power of the motor when the spool is driven by the motor, wherein the peripheral speed of the sprocket becomes slower than the peripheral speed of the spool when rotating power is transmitted to the sprocket through said one way clutch.

5. A camera according to claim 4, further comprising a friction member at the spool.

6. A camera according to claim 2, further comprising second switching means for closing as a photographic action is completed and opening as a preparatory action for an exposure is completed, and third switching means for closing in correspondence to a shutter release and connected in series with the second switching means, the power supply to the motor being controlled by said second and third switching means when the direction of the power supply to the motor is switched to the magazine shaft.

7. A camera according to claim 1, further comprising:
   fourth switching means for changing the direction of the power supply to the motor;
   a change over knob associated with the detection means for permitting operation of the fourth switching means from outside of the camera and a retaining means for retaining the change over knob at a shifted position when the change over knob is operated after a magazine is loaded, said retaining means being connected to the detection means.

8. A camera according to claim 1, further comprising prohibition means to prohibit a shutter release when the direction of the power supply to the motor is set to drive the spool.

9. A camera according to claim 1, further comprising:
   a counter to indicate a number of frames of film depending on feeding of the film,
   a back lid opening and closing member operable from outside the camera, and
   a prohibiting member for prohibiting operation of the back lid opening and closing member when the indication of the counter is not at a prescribed state.

10. A camera according to claim 9, wherein said camera includes an externally operable operating knob for preventing operation of the prohibiting member from outside the camera.

11. A camera, in which film is continuously wound onto a spool from a film magazine loaded into the camera, and the film is rewound into the magazine frame by frame during exposure; said camera being operable with a direct power supply and comprising:
    a motor to drive either the spool or a magazine shaft depending on the direction of the power supply, and
    control means for retaining the motor in a state in which power is supplied thereto continuously for rewinding the film into the magazine when no film frames allowing exposures are left.

12. A camera according to claim 11, wherein the control means is arranged to cut off the power supply to the motor before a fore end of the film is housed in the magazine.

13. A camera according to claim 11, wherein the control means includes:
    switching means closed to effect the power supply to the motor when the direction of power supply to the motor is for driving the magazine shaft, and
    a switch drum for closing the switching means when no film frames allowing exposures are left.

14. A camera according to claim 13, further comprising indication means for indicating that the switching means in closed.

15. A camera according to claim 14, wherein the switch drum includes an actuating member for closing said switching means for a prescribed length of time during a film rewinding operation from the moment that a number of exposable frames of film reaches a prescribed number.

16. A camera according to claim 13, further comprising:
    a sprocket,
    a counter associated with the switch drum for indicating a number of film frames, said counter being biased for returning to its initial position, transmitting means for transmitting rotation of the sprocket to the switch drum and the counter, and detection means for detecting loading of the magazine and placing the transmitting means in a non-transmitting state.

17. A camera according to claim 13, further comprising an externally operable operating knob to close the switching means.

18. A camera, wherein film is continuously wound onto a spool from a film magazine loaded into the camera, and exposures are made as the film is rewound into the magazine frame by frame, said magazine having a shaft; said camera being operable by a directional power supply and comprising:
   a motor for driving one of the spool and the shaft of the magazine depending on the direction of the power supply, and
   change over means to detect completion of the take up of the film by the spool and for changing the direction of the power supply to the motor from a spool driving direction to a direction for driving the magazine shaft.

19. A camera according to claim 18, wherein the motor is arranged to apply a torque to the spool and the change over means is arranged for detecting variation in the torque applied to the spool for controlling the direction of the power supply to the motor.

20. A camera according to claim 18, further comprising switching means closed in response to a photographic operation having been completed and opened upon completion of preparations for an exposure, wherein the power supply to the motor is controlled through said switching means when the change over means changes the direction of the power supply to the motor to drive the magazine shaft.

21. A camera according to claim 18, wherein the change over means further comprises:
   a first shifting member for detecting loading of a magazine and shifting a prescribed amount, a second shifting member supported at the first shifting member in a freely shiftable manner for determining the direction of the power supply to the motor by the position of said second shifting member, and
   a prohibiting member for prohibiting shifting of the second shifting member and releasing the prohibition when taking up of the film to the spool has been completed.

22. A camera according to claim 21, further comprising an operating knob for operating the prohibiting member externally.

23. A camera according to claim 21, wherein the change over means further comprises urging means between the first and second shifting members to be charged by the movement if the first shifting member and to drive the second shifting member.

* * * * *